March 9, 1943. J. L. GRATZMÜLLER ET AL 2,313,486

PACKING DEVICE

Filed Nov. 26, 1938

Inventors:
J. L. Gratzmuller
L. R. Ignace
By: Glascock Downing & Seebold
Attys.

UNITED STATES PATENT OFFICE 2,313,486

PACKING DEVICE

Jean Louis Gratzmüller, Boulogne-sur-Seine, and Lionel René Ignace, Bougival Seine-et-Oise, France; vested in the Alien Property Custodian Application November 26, 1938, Serial No. 242,616
In Luxemburg December 2, 1937

3 Claims. (Cl. 267—35)

The present invention relates to devices including a piston and a rectilinear or curvilinear cylinder cooperating therewith, and its object is to provide perfect fluidtightness between said piston and said cylinder.

According to an essential feature of the invention, there is provided, between the piston and the cylinder, a free space the section of which is small relatively to that of the piston. This space is filled with a cylindrical annular element made of a matter which is elastic but volumetrically incompressible or substantially so. For instance we make use of rubber.

This annular element is mounted in such manner as to oppose, through its contact with the cylindrical faces of the piston and of the cylinder, a resistance to sliding such that, it can slide neither with respect to the piston or with respect to the cylinder when subjected to an axle thrust. This resistance to sliding can result either from an initial compression of the elastic matter in the space existing between the piston and the cylinder, or from a gluing of the elastic matter on the cylindrical faces of the piston and the cylinder. This gluing can be obtained in any suitable manner. For instance, in the case of a cylindrical ring of rubber, the latter can be vulcanized on the piston and the cylinder. These two arrangements can be used either together or separately. The sliding of the piston in the cylinder is made possible by deformation of the cylindrical annular element, the elastic matter being subjected to shearing stresses, without variation of its volume. Owing to the volumetric incompressibility of the elastic matter, the efforts which prevent sliding of the cylindrical annular element are distributed over the whole of the contacting surfaces.

The thickness of the elastic annular element is to be proportional to the amplitude of displacement of the piston.

The height of the elastic annular element must be proportional to the difference of the pressure $p$ and $p'$ which are to act on the two respective faces of the piston.

A very slight volumetric compressibility of the matter which constitutes the annular element is advantageous.

The system according to the present invention has the following advantages:
1. Perfect fluidtightness;
2. No friction stress between the piston and the cylinder;
3. The volume generated by a unitary displacement of the piston is constant, whatever be the position of the piston in the cylinder;
4. The cost of manufacture is low, as no piece calls for a delicate machining;
5. There is an excellent guiding of the piston on the cylinder, so that lubrication is wholly unnecessary;
6. The piston is elastically urged toward its normal position.

Other features of the present invention will be hereinafter described with reference to specific embodiments which are to be shown in detail.

Preferred embodiments of the present invention will be hereinafter described, with reference to the accompanying drawing, given merely by way of example, and in which.

Figure 1:
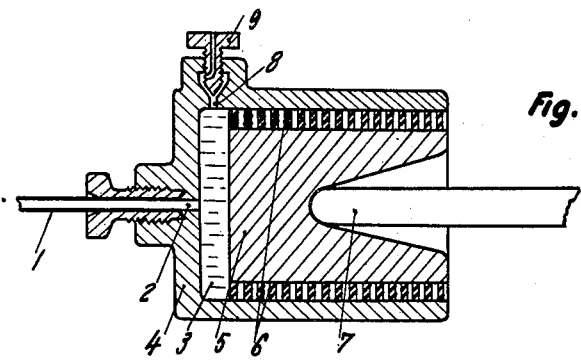
Fig. 1 is an axial sectional view of a hydraulic or pneumatic receiver provided with the fluidtight cylindrical ring made according to the present invention; the piston being in the position of rest.

Referring first to the drawing, it will be seen that the fluid under pressure reaches the receiver through pipe 1 and enters chamber 3 through the orifice 2 provided in the wall of cylinder 4. The fluid pressure acts on piston 5 and on the cylindrical annular member 6 made of elastic material. This annular member tends to slide between cylinder 4 and piston 5, which is itself maintained by thrust rod 7. Such a sliding displacement is prevented by the adhesion of the elastic material on the two cylindrical surfaces of the piston and the cylinder. The pressure exerted by the fluid on annular member 6 is thus distributed between the piston and the cylinder. Piston 5 is thus subjected to a thrust equal to the pressure of the fluid on the head thereof, plus a part of the pressure of the fluid on the annular member. This thrust is transmitted to the part actuated through thrust rod 7.

The orifice 8 closed by needle screw 9 serves to the removal of air from chamber 3 when an incompressible fluid is used. Sliding of piston 5 in cylinder is made possible by shearing deformation of the matter which constitutes the elastic ring 6.

In Fig. 1, piston 5 and elastic annular member 6 are in their position of rest, the control fluid being not under pressure in chamber 3 and the reaction rod 7 exerting no thrust on piston 5.

Figure 2:
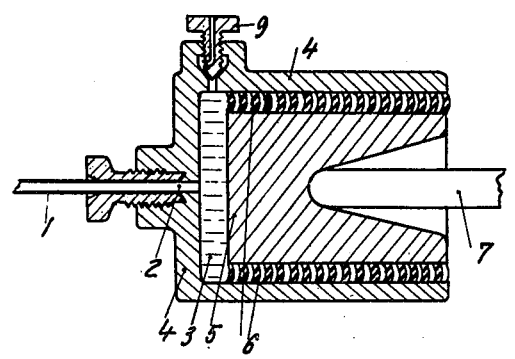
Fig. 2 is a similar view in which the pressure of the control fluid is higher, the piston being in the same position as in Fig. 1.

In Fig. 2, the control fluid is under pressure in chamber 3, but piston 5 is kept in position of rest by the thrust rod 7. The elastic annular member 6 has deformed under the influence of the fluid pressure; the elastic matter that is utilized being volumetrically incompressible or substantially so, the deformations of the cross sections of the annular member 6 are the same in the vicinity of chamber 3 and in the vicinity of the other face of the piston, and therefore the sliding tendency is constant along a generatrix.

Figure 3:
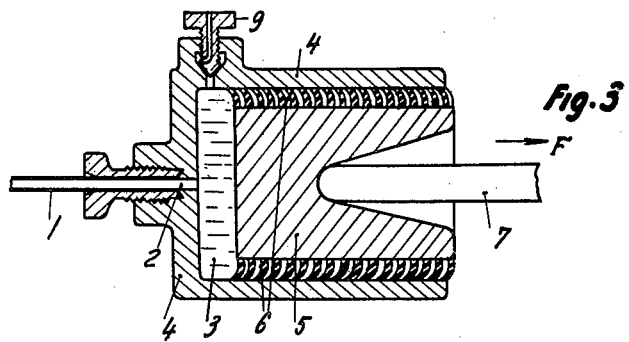
Fig. 3 is a similar view showing the piston in another position, also for a high pressure of the fluid.

In Fig. 3, the control fluid is under pressure in chamber 3 and piston 5 has moved in the cylinder in the direction of arrow F. The elastic annular element 6 has been deformed under the double effect of the pressure of the fluid and of the displacement of the piston. As the elastic matter that is used is volumetrically incompressible, the deformations of the cross-sections of annular element 6 are the same in the vicinity of chamber 3 and in the vicinity of the other face of the piston, and therefore sliding tendency of the cylindrical annular element is constant along a generatrix.

Figure 4:
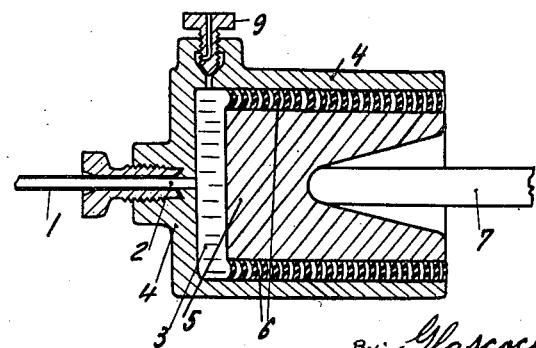
Fig. 4 shows a hydraulic receiver similar to that of Fig. 1, but in which the elastic matter which constitutes the cylindrical annular element has a slight volumetric compressibility.

In Fig. 4, the control fluid is under pressure in chamber 3, but piston 5 is kept in position of rest by the thrust rod 7. The elastic annular member 6 is constituted, in this case of an elastic matter which is volumetrically compressible to a slight degree. Annular member 6 has been deformed under the influence of the fluid pressure, but, as a consequence of the compressibility of the elastic material, the deformations of the cross sections are more important in the vicinity of the pressure chamber 3 than in the vicinity of the other end of said annular member. The deformations decrease regularly from one end of said ring to the other end. Therefore, the tendency to sliding of annular member 6 along its faces in contact with cylinder 4 and piston 5 decreases gradually from the end in contact with chamber 3, where adhesion is improved by the internal pressure, to the other end of the annular member. As the properties of adhesion of the annular member are thus better utilized, its height can be reduced.

In a general manner, while we have, in the above description, disclosed what we deem to be practical and efficient embodiments of the present invention, it should be well understood that we do not wish to be limited thereto as there might be changes made in the arrangement, disposition, and form of the parts without departing from the principle of the present invention as comprehended within the scope of the accompanying claims.

What we claim is:

1. A device which comprises in combination, a cylinder, a piston fitting in said cylinder with annular play, a non-slippable sleeve of an elastic material of low volumetric compressibility forming a packing element between said piston and said cylinder and applied with a high adhesion against the corresponding walls of said piston and said cylinder, said sleeve being of uniform thickness over its whole length and of relative dimensions such that it keeps the piston in accurate axial relation with respect to the cylinder.

2. A device according to claim 1 in which said sleeve is initially radially compressed between said piston and said cylinder.

3. A device according to claim 1 in which said sleeve adheres to the corresponding walls of said piston and said cylinder.

JEAN LOUIS GRATZMÜLLER.
LIONEL RENÉ IGNACE.